United States Patent
Yoshikawa et al.

[11] Patent Number: 5,900,955
[45] Date of Patent: May 4, 1999

[54] OPTICAL SCANNING SYSTEM INCLUDING TWO HOLOGRAM ELEMENTS

[75] Inventors: Hiroyasu Yoshikawa; Shinya Hasegawa; Satoshi Maeda; Shigeo Kayashima; Fumio Yamagishi, all of Kawasaki, Japan

[73] Assignee: Fujitsu Limited, Kawasaki, Japan

[21] Appl. No.: 08/861,639

[22] Filed: May 22, 1997

Related U.S. Application Data

[63] Continuation of application No. 08/598,408, Feb. 8, 1996, abandoned, which is a continuation of application No. 08/248,201, May 24, 1994, abandoned.

[30] Foreign Application Priority Data

Jun. 16, 1993 [JP] Japan .................................. 5-144879

[51] Int. Cl.$^6$ .............................. G02B 5/32; G02B 26/10
[52] U.S. Cl. .............................................. 359/17; 359/19
[58] Field of Search ................................. 359/15, 17, 18, 359/19, 205, 206, 207

[56] References Cited

U.S. PATENT DOCUMENTS

| | | | |
|---|---|---|---|
| 4,073,566 | 2/1978 | Noguchi | 359/17 |
| 4,106,844 | 8/1978 | Bryngdahl et al. | 359/17 |
| 4,118,106 | 10/1978 | Leith | 359/15 |
| 4,176,907 | 12/1979 | Matsumoto et al. | 359/217 |
| 4,299,437 | 11/1981 | Ono | 359/17 |
| 4,378,142 | 3/1983 | Ono | 359/18 |
| 4,756,583 | 7/1988 | Morimoto | 359/207 |
| 4,832,464 | 5/1989 | Kato et al. | 359/565 |
| 4,898,437 | 2/1990 | Brueggemann | 359/217 |
| 4,948,213 | 8/1990 | Hasegawa et al. | 359/18 |
| 5,013,133 | 5/1991 | Buralli et al. | 359/558 |
| 5,033,060 | 7/1991 | Leger et al. | 359/565 |
| 5,039,183 | 8/1991 | Meyers | 359/19 |
| 5,251,055 | 10/1993 | Koide | 359/207 |
| 5,291,318 | 3/1994 | Genovese | 359/17 |
| 5,295,004 | 3/1994 | Hasegawa et al. | 359/19 |
| 5,296,689 | 3/1994 | Reddersen et al. | 359/17 |
| 5,309,261 | 5/1994 | Yang | 359/17 |
| 5,361,149 | 11/1994 | Hasegawa et al. | 359/9 |

FOREIGN PATENT DOCUMENTS

| | | | |
|---|---|---|---|
| 54-17038 | 8/1979 | Japan | 359/18 |
| 62-194215 | 8/1987 | Japan | 359/17 |
| 2-179605 | 7/1990 | Japan | . |
| 3-249724 | 11/1991 | Japan | 359/18 |
| 4-45412 | 2/1992 | Japan | 359/18 |
| 4-289814 | 10/1992 | Japan | 359/18 |
| 5-281489 | 10/1993 | Japan | 359/18 |
| 5-281490 | 10/1993 | Japan | 359/18 |

*Primary Examiner*—Jon Henry
*Attorney, Agent, or Firm*—Armstrong, Westerman, Hattori, McLeland & Naughton

[57] ABSTRACT

An optical scanning system includes a laser source, a deflector deflecting a laser beam emitted from the laser source, and at least two hologram elements located between the deflector and an image forming member.

14 Claims, 12 Drawing Sheets

OPTICAL SCANNING SYSTEM INCLUDING TWO HOLOGRAM ELEMENTS

This application is a continuation of application Ser. No. 08/598,408, filed Feb. 8, 1996, now abandoned, which is a continuation of continuation of application Ser. No. 08/248,201 filed May 24, 1994, now abandoned.

BACKGROUND OF THE INVENTION

1. Field of the Invention

The present invention generally relates to optical scanning systems, and more particularly to an optical scanning system having a laser beam source, a deflector and hologram elements and performing highly-precise laser scan.

Optical scanning systems are applied to various devices such as a laser beam printer and an optical instrument, and scan an object by deflecting the laser beam. It is required that these optical scanning systems can realize a highly-precise laser scan.

2. Description of the Prior Art

An optical scanning system having a polygon mirror and an f-ζ lens system is well known as an optical scanning system in which the laser beam scans an object.

However, such an optical scanning system has a disadvantage in that it is very expensive because the f-Θ lens system is made up of a plurality of lens groups. With the above in mind, recently, there has been considerable activity in the development of an optical scanning system that uses a hologram disk. As shown in FIG. 1, an optical scanning system using a hologram disk utilizes a characteristic in which the diffracting direction of the incident beam depends on the position of the incident beam on a lens. Recently, it has been proposed that a plurality of hologram elements are used instead of a lens.

FIG. 2 shows such an application of hologram elements, in which a hologram disk is illustrated. The hologram disk includes a plurality of hologram elements disposed on a disk in a ring formation. The hologram disk is rotated to move the incident laser beam that scans an object.

Optical scanning systems using hologram disks as described above have a disadvantage in that the image plane of the laser beam is moved due to a variation in the wavelength of the laser beam. In order to eliminate the above disadvantage, other hologram elements are additionally used to compensate for a variation in the wavelength of the laser beam to make the laser beam project onto an identical point even when the wavelength of the laser beam varies.

The optical scanning system using the above-mentioned hologram disk realizes highly-precise laser scan. However, the hologram disk does not have strong mechanical strength, and cannot be rotated at high speeds. Hence, the optical scanning system using the hologram disk cannot realize high-speed laser scanning.

SUMMARY OF THE INVENTION

It is a general object of the present invention to provide an optical scanning system in which the above disadvantages are eliminated.

A more specific object of the present invention is to provide an optical scanning system capable of performing highly-precise, high-speed laser scan.

These objects of the present invention are achieved by an optical scanning system comprising:

a laser source;

a deflector deflecting a laser beam emitted from the laser source; and at least two hologram elements located between the deflector and an image forming member.

Preferably, each of said at least two hologram elements has the following phase transfer function $\phi(x, y)$:

$$\phi(x, y) = (2\pi/\lambda) \cdot [\Sigma c_i r^{2i}]$$

where x denotes a position in a main scanning direction of a hologram, y denotes a position in a direction perpendicular to the main scanning direction, r denotes a distance from a center of the hologram, namely $(x^2+y^2)^{0.5}$, $\lambda$ is a wavelength of the laser beam, $c_i$ denotes coefficients, and i is an arbitrary integer.

Preferably, each of said at least two hologram elements has the following phase transfer function $\phi(x, y)$:

$$\phi(x, y) = (2\pi/\lambda) \cdot [\Sigma c_i r^{2i} + \sin(\alpha)y]$$

where x denotes a position in a main scanning direction of a hologram, y denotes a position in a direction perpendicular to the main scanning direction, r denotes a distance from a center of the hologram, namely $(x^2+y^2)^{0.5}$, $\lambda$ is a wavelength of the laser beam, $c_i$ denotes coefficients, i is an arbitrary integer, and a denotes an arbitrary angle; and wherein signs of terms $\sin(\alpha)$ in the phase transfer functions of said at least two hologram elements are different from each other.

BRIEF DESCRIPTION OF THE DRAWINGS

Other objects, features and advantages of the present invention will become more apparent from the following detailed description when read in conjunction with the accompanying drawings, in which:

FIGS. 5A and 5B are diagrams showing coefficient values in a phase transfer function obtained by a computer simulation;

DESCRIPTION OF THE PREFERRED EMBODIMENTS

Figure 1:
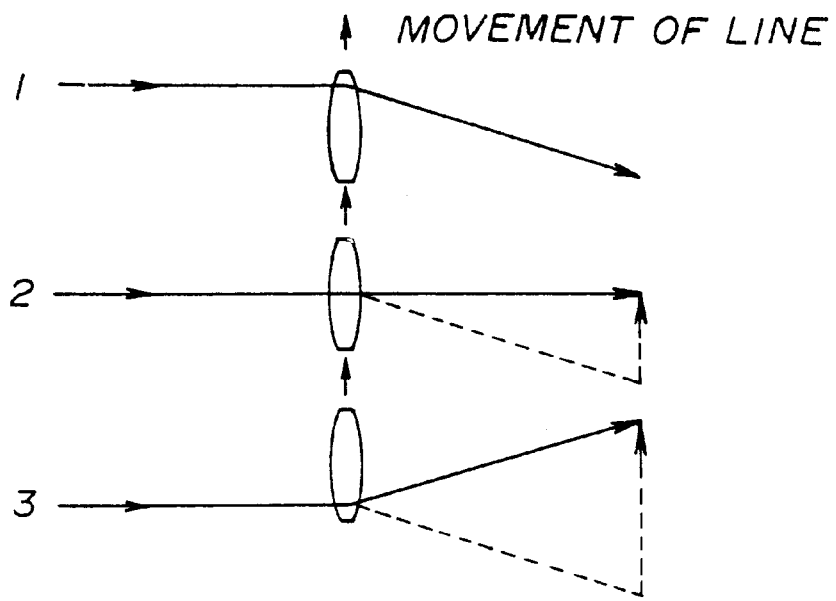
FIG. 1 is a diagram of the principle of laser scan.
Figure 2:
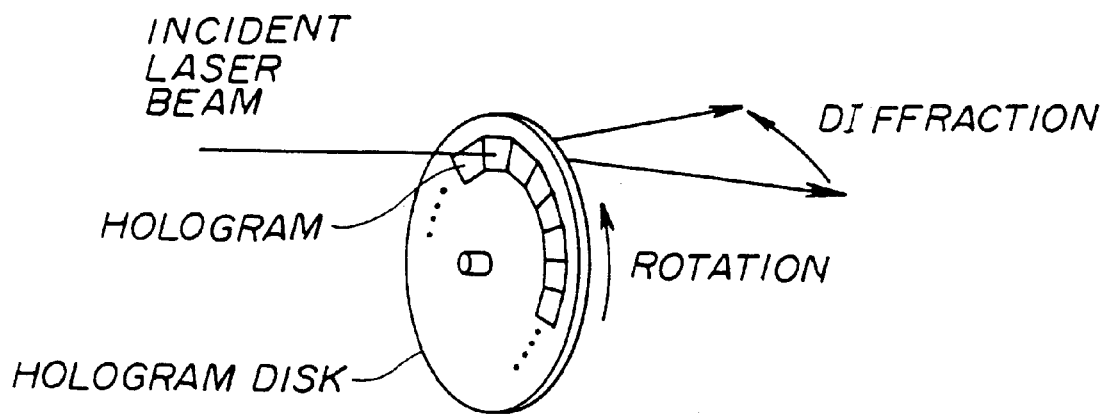
FIG. 2 is a prior art of the principle of a conventional hologram scanner.
Figure 3A:
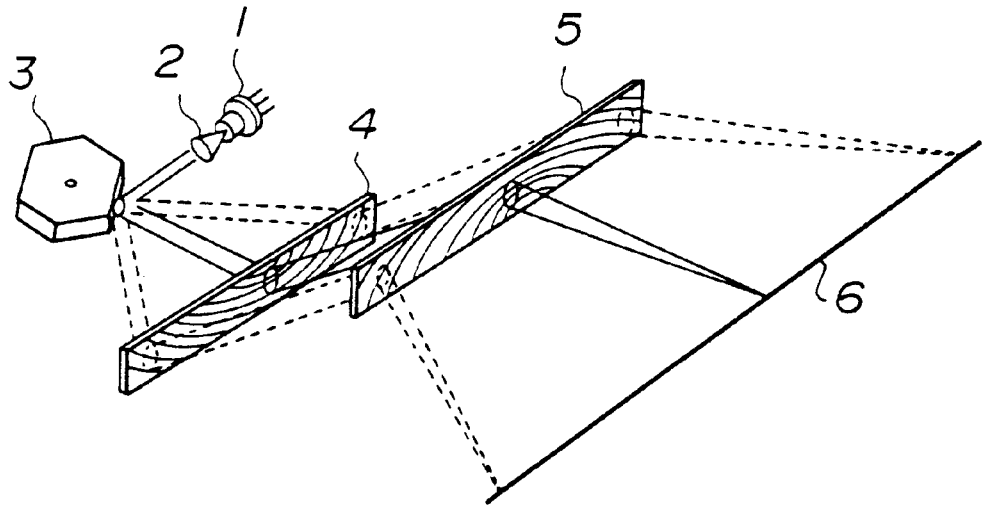
FIG. 3A and 3B are diagrams of the principle of the present invention.

FIG. 3A is a perspective view of the basic structure of an optical scanning system according to the present invention. The optical scanning system shown in FIG. 3A includes a laser source 1, a collimating lens 2, a deflector 3, a front-stage (first stage) hologram element 4, and a rear-stage (second stage) hologram element 5. The laser source 1 is formed with, for example, a semiconductor laser, and emits a laser beam. The collimating lens 2 collimates the laser beam emitted from the laser source 1. The deflector 3 is formed with, for example, a polygon mirror, and deflects the laser beam from the collimating lens 2. The first-stage hologram element 4 diffracts the laser beam deflected by the deflector 3. The second-stage hologram element 5 diffracts the laser beam diffracted by the first-stage hologram element 4, and irradiates the diffracted laser beam onto an image forming plane 6.

Figure 3B:
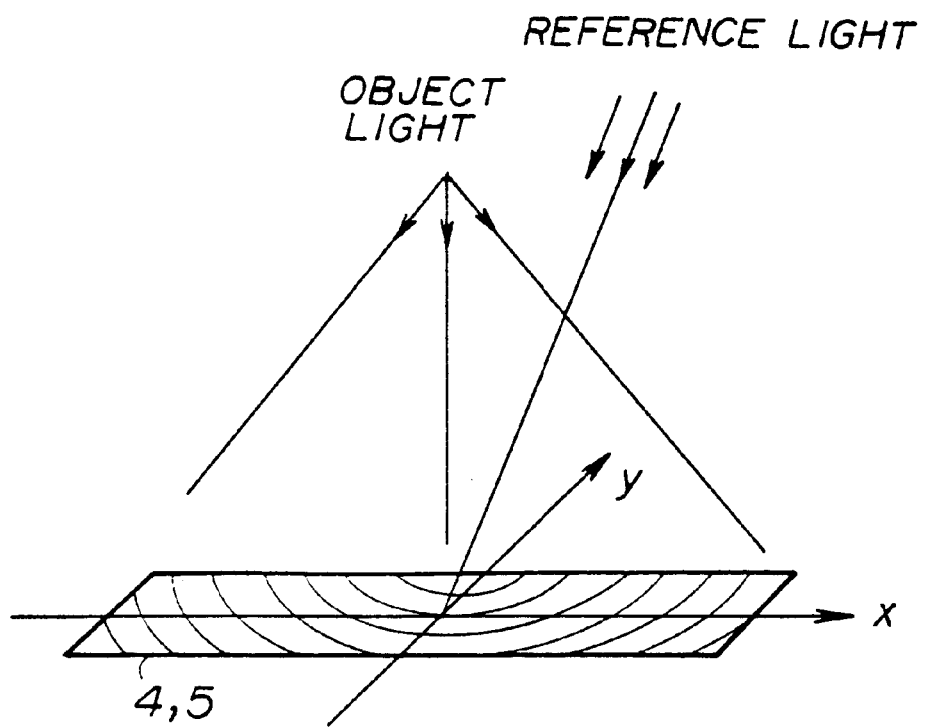

As shown in FIG. 3B, the first-stage hologram element 4 and the second-stage hologram element 5 respectively have a phase transfer function $\phi(x, y)$ defined from interference fringes formed by the object light and the reference light. More particularly, each of the first-stage hologram element 4 and the second-stage hologram element 5 can be mathematically expressed by the phase transfer function $\phi(x, y)$ written as follows:

$$\phi(x, y) = (2\pi/\lambda) \cdot [\Sigma c_i r^{2i}]$$

where:

x denotes the position in the main scanning direction of the hologram;

y denotes the position in the direction perpendicular to the main scanning direction;

r denotes the distance from the center of the hologram and is equal to $(x^2+y^2)^{0.5}$;

$\lambda$ denotes the wavelength of the laser beam;

$c_i$ is a constant;

i denotes positive integers; and $\Sigma$ denotes the sum of items with respect to i.

Each of the first-stage hologram element 4 and the second-stage hologram element 5 can also be mathematically expressed by the phase transfer function $\phi(x, y)$ written as follows:

$$\phi(x, y) = (2\pi/\lambda) \cdot [C\Sigma c_i r^{2i}] + \sin(\alpha)y]$$

where:

$\alpha$ denotes an arbitrary angle.

According to the present invention, the phase transfer functions $\phi(x, y)$ of the first-stage hologram element 4 and the second-stage hologram element 5 are expanded with even powers of r. That is, the phase transfer functions $\phi(x, y)$ are rotationally symmetrical about the optical axis.

Coma aberration does not take place in the waveform plane reproduced by the holograms having the above-mentioned phase transfer functions $\phi(x, y)$, so that the beam spot size can be reduced. Further, the phase transfer functions $\phi(x, y)$ of the hologram elements 4 and 5 are symmetrical with respect to the main scanning direction x, so that a uniform linear scan becomes possible. The uniform linear scan can be achieved by determining the values of the coefficients $c_i$ using an algorithm of the attenuation least square method.

It is preferable that the first-stage hologram element 4 and the second-stage hologram element 5 have the mutually different signs of the term $\sin(\alpha)$. When the phase transfer function $\phi(x, y)$ contains the term "$\sin(\alpha)y$", an off-axis hologram is formed. In this case, the scanning line is curved. In order to cancel curvature of the scanning line, the signs of the term $\sin(\alpha)$ of the first-stage hologram element 4 and the second-stage hologram element 5 are selected so as to be opposite to each other.

Further, the first-stage hologram element 4 and the second-stage hologram element 5 can be formed so that the expressions $\Sigma$ of the phase transfer functions $\phi(x, y)$ contain one or a plurality of products of even powers of x multiplied by the coefficient values and odd powers of y multiplied by the above coefficient values, or one or a plurality of products of even powers of x multiplied by the coefficient values and even powers of y multiplied by the above coefficient values. The beam aberration can be reduced by determining the above coefficient values by the attenuation least square algorithm.

Furthermore, there is a case where the phase characteristic of the phase transfer function $\phi(x, y)$ of either the first-stage hologram element 4 or the second-stage hologram element 5 indicates convergence (convex lens function), and the phase characteristic of the other hologram element indicates divergence (concave lens function). In this case, it is preferable that the phase transfer function $\phi(x, y)$ of the first-stage hologram element 4 indicates a convergent phase characteristic and the phase transfer function $\phi(x, y)$ of the second-stage hologram element 5 indicates a divergent phase characteristic. With the combination of the two different lens functions, it becomes possible to further reduce the beam aberration.

Moreover, according to the present invention, it becomes possible to cancel a jitter due to a variation in the wavelength of the laser beam by the combination of two holograms, that is, the front-stage hologram element 4 and the second-stage hologram element 5. Hence, the deflector 3 can be formed with a highly rotatable deflector such as a polygon mirror, whereby a high-speed optical scanning system can be achieved.

Figure 4:
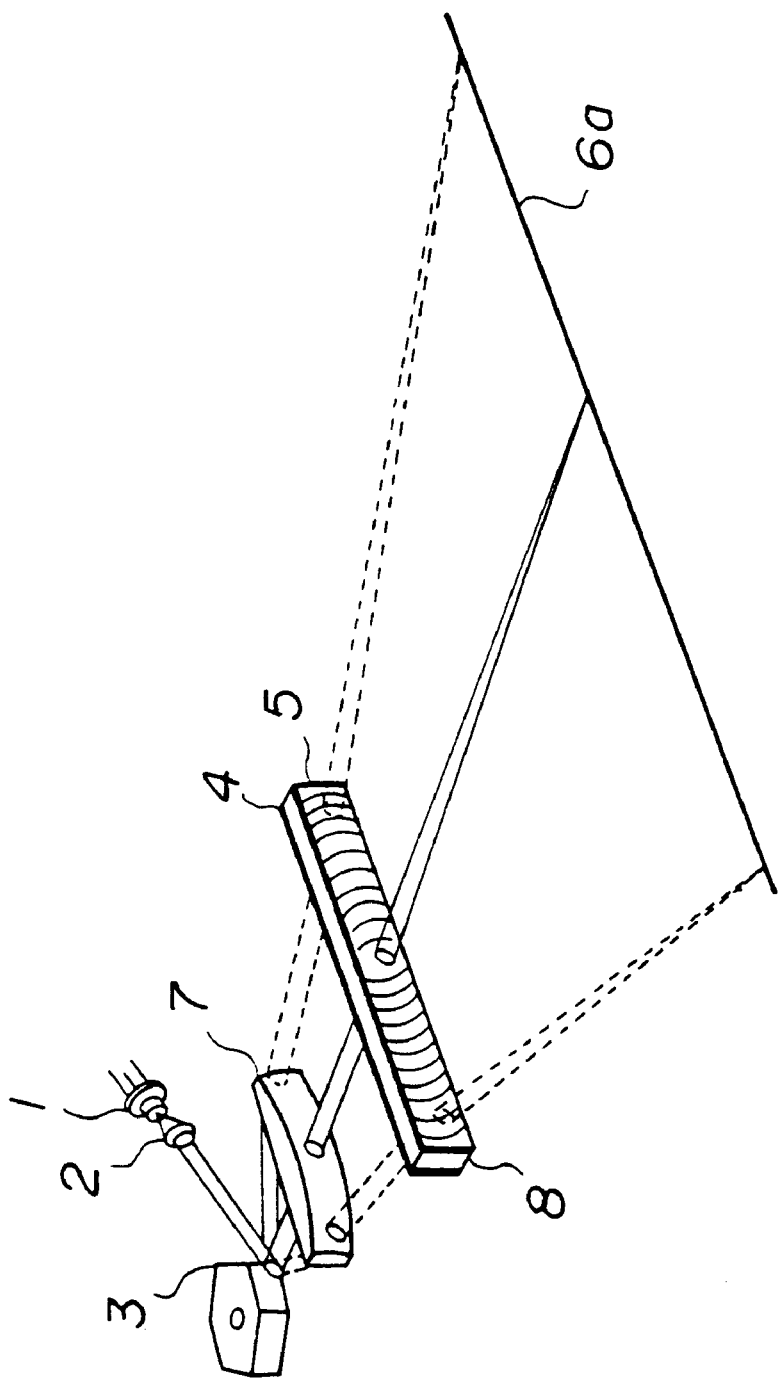
FIG. 4 is a perspective view of an optical scanning system according to a first embodiment of the present invention.

A description will now be given, with reference to FIG. 4, of a first embodiment of the present invention. In FIG. 4, parts that are the same as those shown in FIG. 3A are given the same reference numbers as previously. An optical scanning system shown in FIG. 4 is made up of the laser diode 1, the collimating lens 2, the polygon mirror 3, the first-stage hologram element 4, the second-stage hologram element 5, a flat plane/convex spherical lens 7, and a transparent glass plate 8. The flat plane/convex spherical lens 7 has a flat plane receiving the laser beam emitted from the laser diode 1 and deflected by the polygon mirror 3, and a convex spherical surface opposite to the flat plane. The first-stage hologram element 4 is attached to a first surface of the glass plate 8 and the second-stage hologram element 5 is attached to a second surface thereof opposite to the first surface. The laser beam outgoing from the second-stage hologram element 5 is irradiated on a photosensitive member 6a of, for example, a drum shape.

The flat plane/convex spherical lens 7 is used to reduce the distance between the polygon mirror 3 and the photosensitive member 6a. The glass plate 8 is used to support the first-stage hologram element 4 and the second-stage hologram element 5 by a single base and to achieve compact mounting of these two hologram elements 4 and 5. It is possible to assemble a less-expensive unit of the first-stage hologram element 4, the glass plate 8 and the second-stage hologram element 5 by injection using a plastic material.

It will now be assumed that the phase transfer function $\phi(x, y)$ of the first-stage hologram element 4 shown in FIG. 4 is mathematically expressed as follows:

$$\phi(x, y) = (2\pi/\lambda) \cdot [c_1 x + c_2 y + c_3 x^2 + c_4 xy + \\ c_5 y^2 + c_6 x^3 + c_7 x^2 y + c_8 xy^2 + \\ c_9 y^3 + c_{10} x^4 + c_{11} x^3 y + c_{12} x^2 y^2 + \\ c_{13} xy^3 + c_{14} y^4 + c_{15} x^5 + c_{16} x^4 y + \\ c_{17} x^3 y^2 + c_{18} x^2 y^3 + c_{19} xy^4 + c_{20} y^5]$$

The parameters x, y and $\lambda$ are the same as defined previously. The above mathematical expression can be rewritten as follows:

The following will now be assumed:

$$c_1=c_2=c_4=c_6=c_8=c_{11}=c_{13}=c_{15}=c_{17}=c_{19}=0.$$

In this case, the above mathematical expression can be rewritten as follows:

$$\phi(x, y) = (2\pi/\lambda) \cdot [c_3 x^2 + c_5 y^2 + c_7 x^2 y + \\ c_9 y^3 + c_{10} x^4 + c_{12} x^2 y^2 + c_{14} y^4 + \\ c_{16} x^4 y + c_{18} x^2 y^3 + c_{20} y^5]$$

Similarly, the phase transfer function $\phi(x, y)$ will be assumed as follows:

$$\phi(x, y) = (2\pi/\lambda) \cdot [c_3 x^2 + c_5 y^2 + c_7 x^2 y + \\ c_9 y^3 + c_{10} x^4 + c_{12} x^2 y^2 + c_{14} y^4 + \\ c_{16} x^4 y + c_{18} x^2 y^3 + c_{20} y^5]$$

The phase transfer functions $\phi(x, y)$ of the first-stage hologram element 4 and the second-stage hologram element 5 thus assumed have the following basic formulation:

$$\phi(x, y)=(2\pi/-80\ )\cdot[\alpha_1(x^2+y^2)+\alpha_2(x^2+y^2)^2]$$

and the following products of even powers of x and the powers of y are added to the above basic formulation: "$x^2y$", "$y^3$", "$x^4y$", "$x^2y^3$" and "$y^5$". The asymmetrical terms in the y direction that does not much affect the uniform linear scan are positively added in order to reduce the beam aberration.

By optimizing the coefficient values of the above phase transfer function $\phi(x, y)$, it becomes possible to construct an optical scanning system having the high-performance laser scanning function. This optimizing process can be the attenuation least square algorithm (normally called DLS) used for the lens design. In the optimizing process, the coefficient values are updated so that the function values of the phase transfer function become more appropriate than previously. Then, ray tracing is performed by using the phase transfer function $\phi(x, y)$ having the coefficient values thus determined in order to evaluate speed uniformity, linearity, waveform jitters and beam aberration. Until satisfactory evaluation is obtained, the updating process for the coefficient values is repeatedly performed.

Figures 5A, 5B:
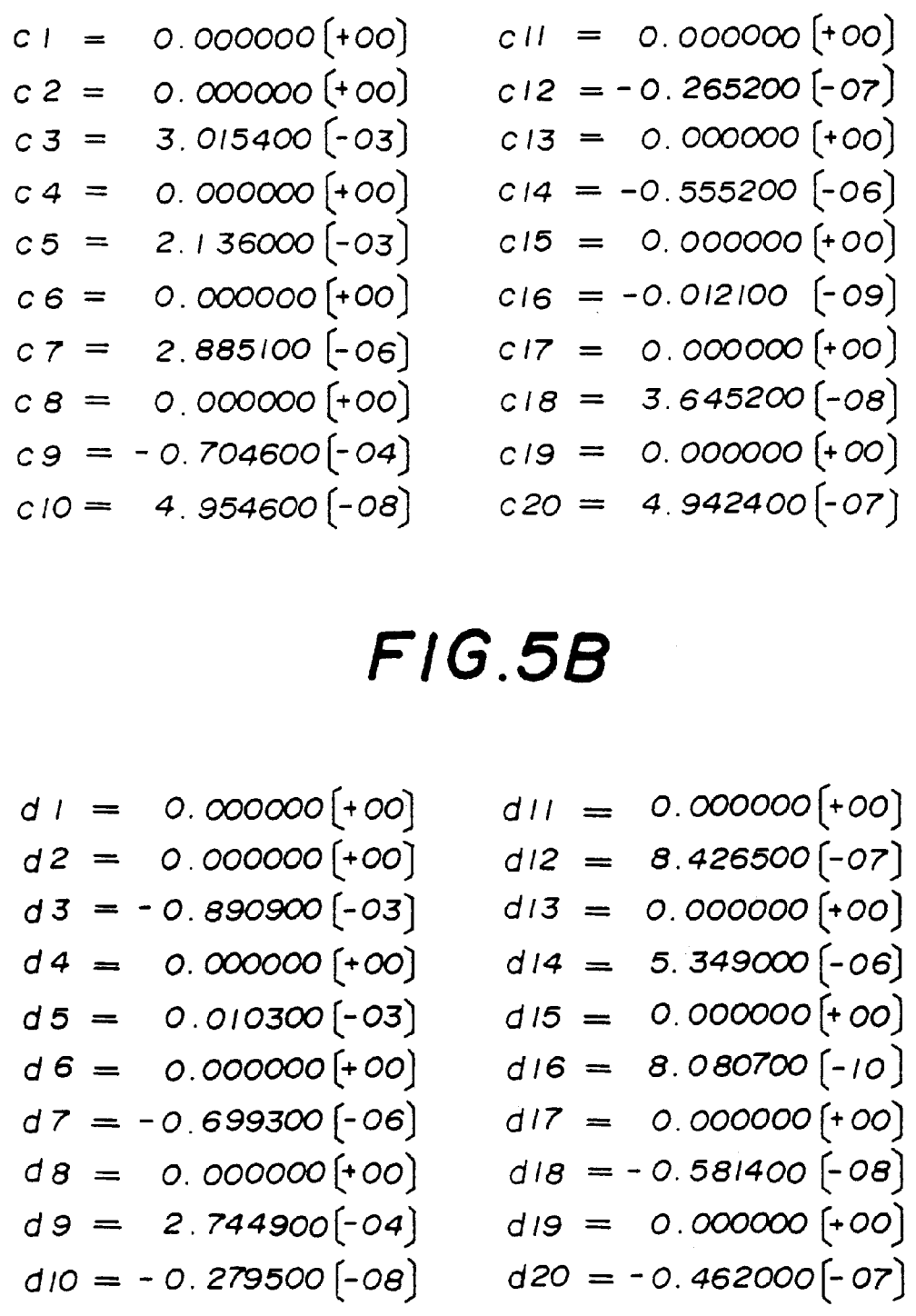

FIGS. 5A and 5B show examples of the coefficient values $c_i$ and $d_i$ of the above-mentioned phase transfer function $\phi(x, y)$ determined according to the attenuation least square algorithm under the following conditions in the structure shown in FIG. 4:

wavelength of laser beam 785 nm radius of curvature of lens 7 100 mm distance between mirror 3 and lens 7 60 mm distance between lens 7 and element 4 30 mm distance between elements 4 and 5 5 mm distance between element 5 and drum 6a 200 mm In FIGS. 5A and 5B, [ab] denotes $e^{ab}$.

Figure 6:
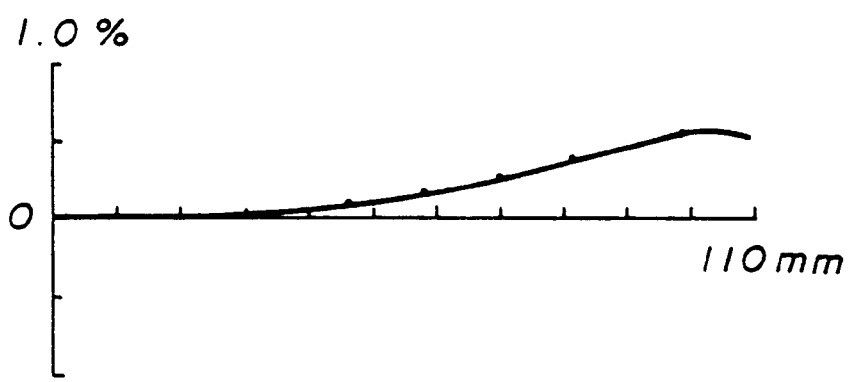
FIG. 6 is a graph of a constant-velocity characteristic of the first embodiment of the present invention obtained according to a computer simulation.
Figure 7:
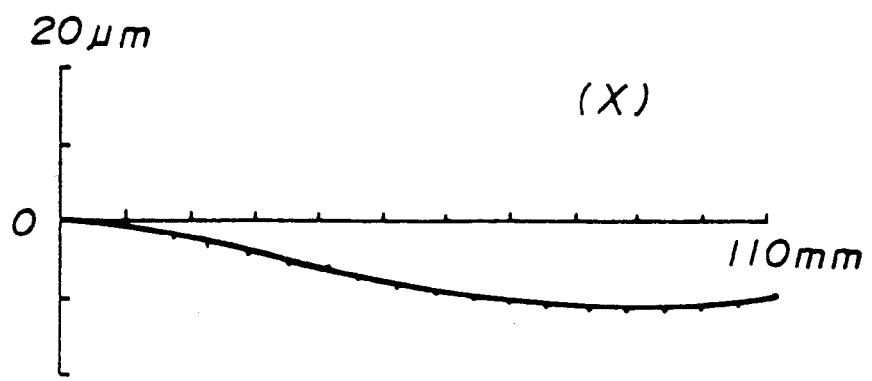
FIG. 7 is a graph of a jitter characteristic of the first embodiment of the present invention obtained according to a computer simulation.
Figure 8:
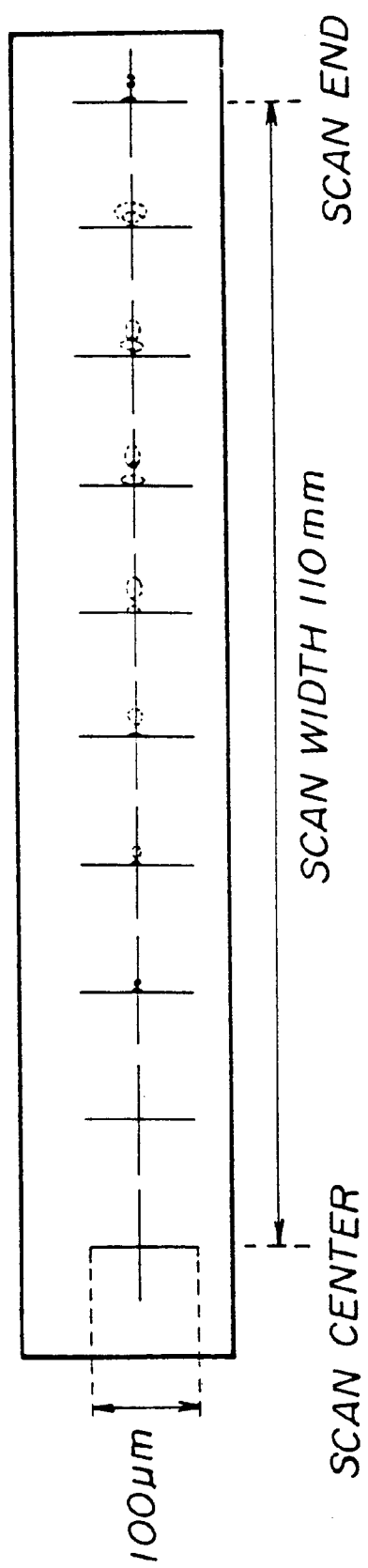
FIG. 8 is a diagram showing a beam aberration characteristic of the first embodiment of the present invention according to a computer simulation.

FIG. 6 is a graph of the speed uniformity (constant velocity performance) of the optical scanning system realized by the coefficient values shown in FIGS. 5A and 5B. FIG. 7 is a graph of simulation data of a jitter caused in the optical scanning system realized by the coefficient values shown in FIGS. 5A and 5B obtained when the wavelength of the laser beam varies by 2 nm. FIG. 8 is a spot diagram showing simulation data of the beam aberration taking place in the optical scanning system realized by the coefficient values shown in FIGS. 5A and 5B.

It can be seen from the graph of FIG. 6 that the optical scanning system realized by the coefficient values shown in FIGS. 4A and 4B has a satisfactory speed uniformity in which the scanning speed obtained at either end of the drum 6a increases by 0.5% with respect to the reference scanning speed obtained at the reference center position of the drum 6a.

It can be seen from the graph of FIG. 7 that the optical scanning system realized by the coefficient values shown in FIGS. 4A and 4B has a satisfactory jitter characteristic in which a jitter of approximately ±10 $\mu$m in the x direction occurs at either end of the drum 6a with respect to the reference center position of the drum 6a. The simulation data assumes the in-line type hologram, and hence there is no jitter in the y direction.

It can be seen from FIG. 8 that the optical scanning system realized by the coefficient values shown in FIGS. 4A and 4B has a satisfactory beam aberration characteristic in which a beam aberration of about 50 $\mu$m occurs in either end of the drum 6a with respect to the reference center position of the drum 6a. The above beam aberration value can achieve a resolution of 300 dpi requiring a beam spot size of 80 $\mu$m. Further, it can be seen from FIG. 8 that the optical scanning system realized by the coefficient values shown in FIGS. 4A and 4B can perform sufficient line scanning.

Consequently, it is confirmed from the simulation data shown in FIGS. 5 through FIG. 7 that the optical scanning system with the coefficient values shown in FIGS. 4A and 4B can realize highly-precise, high-speed laser scanning.

In the phase transfer function $\phi(x, y)$ assumed in the above description, the asymmetrical terms related to the y direction are added in order to reduce the beam aberration. In order to further reduce the beam aberration, it is preferable that one or a plurality of terms of the products of even powers of x and even powers of y, namely "$cx^{2a}y^{2b}$" are added where c is a coefficient, and a and b are positive integers.

Figure 9:
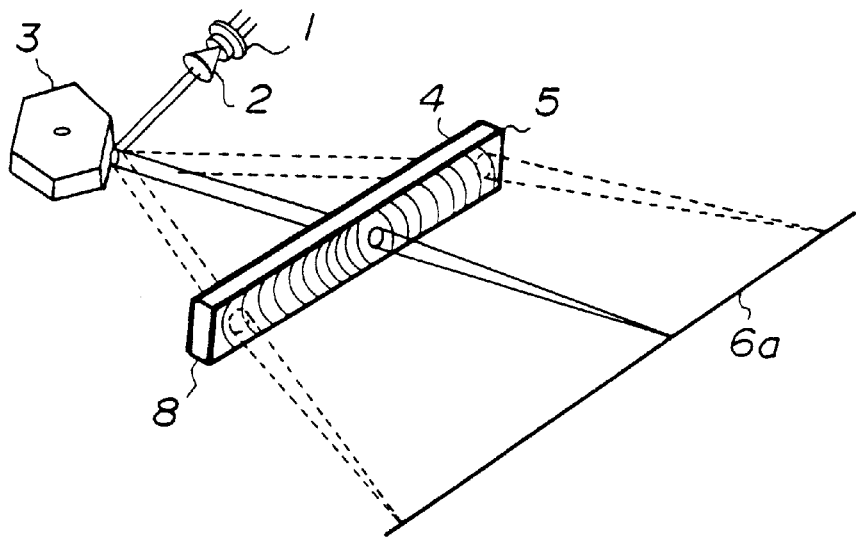
FIG. 9 is a perspective view of an optical scanning system according to a second embodiment of the present invention.
Figure 10:
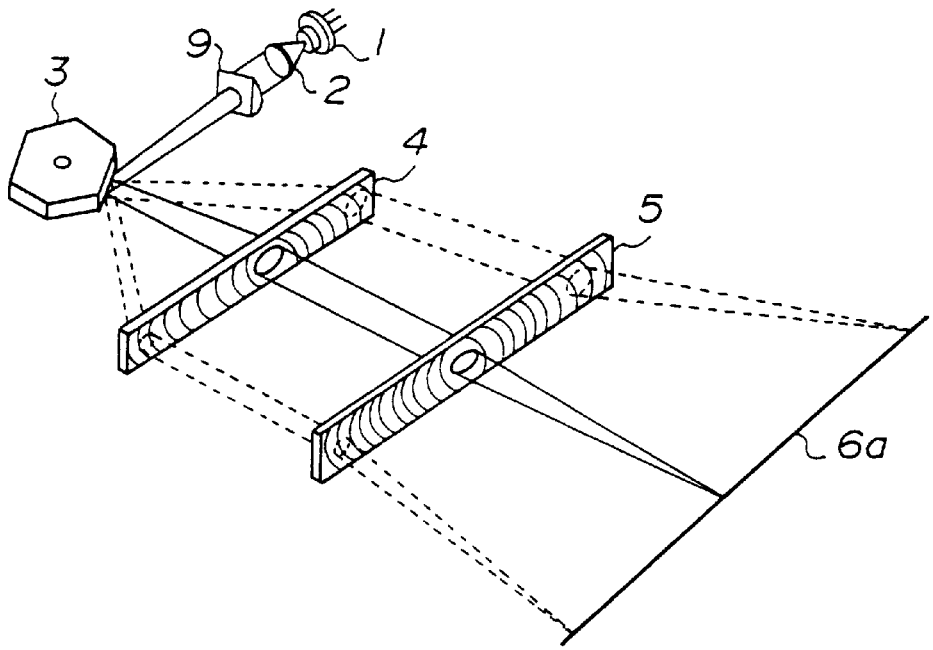
FIG. 10 is a perspective view of an optical scanning system according to a third embodiment of the present invention.

In the embodiment shown in FIG. 3, the flat plane/convex spherical lens 7 is provided between the polygon mirror 3 and the first-stage hologram element 4. Alternatively, it is possible to omit the lens 7, as shown in FIG. 9. In the structure shown in FIG. 9, the first-stage hologram element 4 and the second-stage hologram element 5 are attached to the opposite surfaces of the glass plate 8. Alternatively, it is possible to omit the glass plate 8, as shown in FIG. 10. In the structure shown in FIG. 10, a cylindrical lens 9 is provided between the collimating lens 2 and the polygon mirror 3 in order to prevent a variation in the image point position with respect to a variation in the angle of the mirror surface with respect to the incident laser beam. The cylindrical lens 9 functions to gather the laser beam in the vertical direction.

Figure 11:
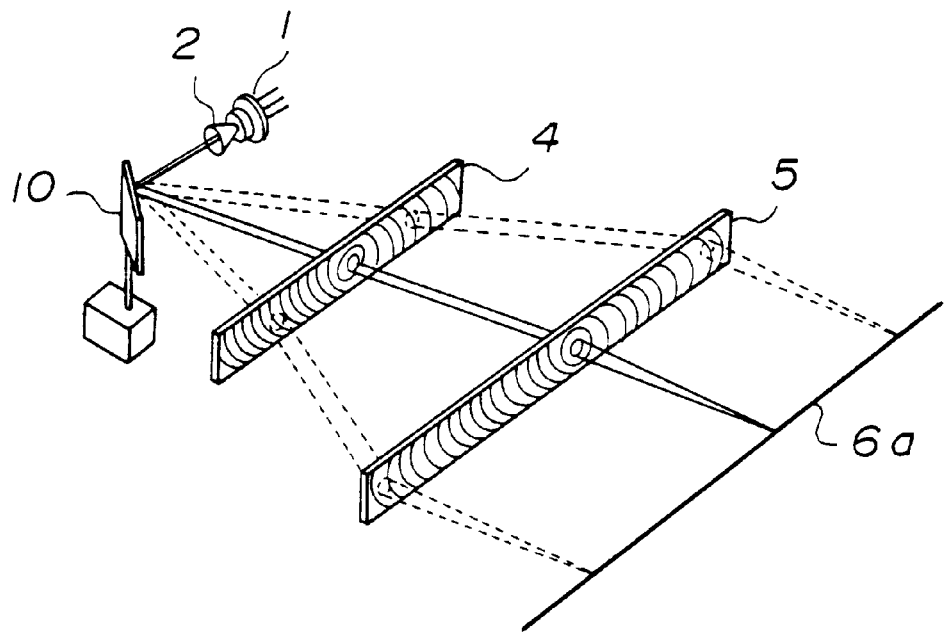
FIG. 11 is a perspective view of an optical scanning system according to a fourth embodiment of the present invention.

Instead of the polygon mirror 3 shown in FIG. 10, a sine-wave vibration mirror 10 can be used, as shown in FIG. 11.

Figure 12:
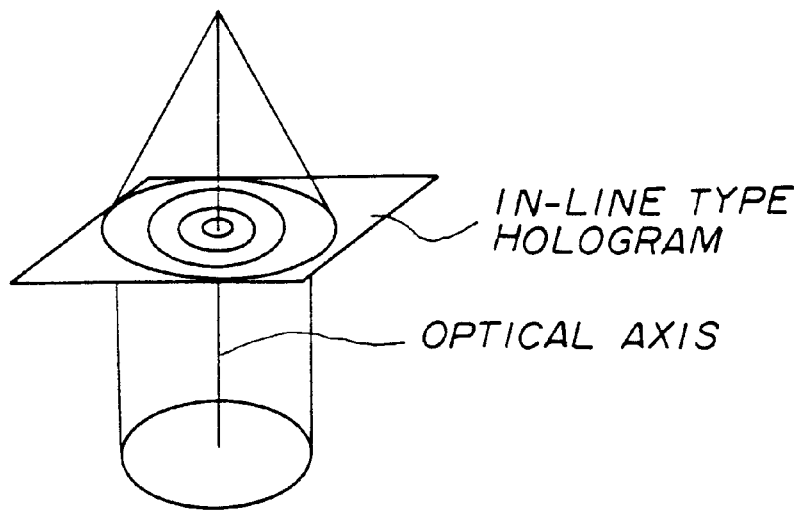
FIG. 12 is a perspective view showing an in-line type hologram.
Figure 13:
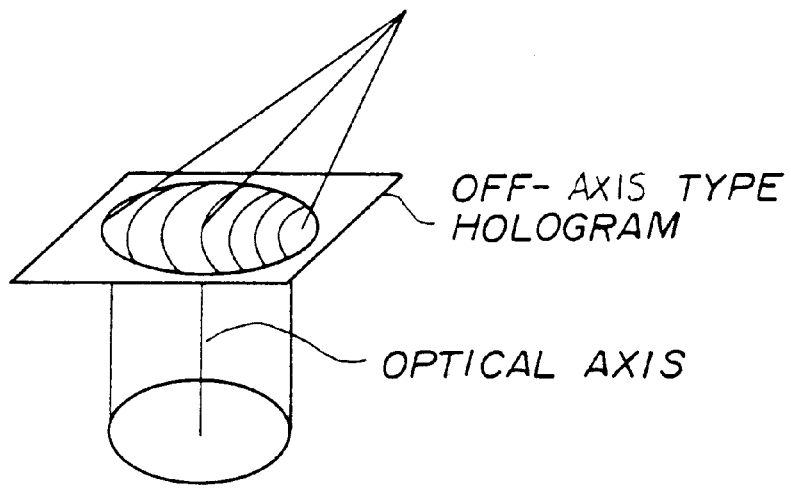
FIG. 13 is a perspective view showing an off-axis type hologram.

The phase transfer function $\phi(x, y)$ written by the above-mentioned mathematical expression assumes an in-line type hologram, as shown in FIG. 12, in which the direction of the optical axis of the optical system is not affected by holograms. However, in practice, it may be difficult to form the in-line type hologram and eliminate the oth-order light after diffraction. With the above in mind, an off-axis type hologram as shown in FIG. 13 can be used in which the direction of the optical axis of the optical system is affected by holograms. The off-axis type hologram has a phase transfer function $\phi(x, y)$ in which the term "$(2\pi/\lambda)\cdot\sin(\alpha)y$" is added to the phase transfer function of the in-line type hologram. That is, the phase transfer function $\phi(x, y)$ of the in-line type hologram has the following mathematical expression:

$$\phi(x, y)=(2\pi/\lambda)\cdot(ax^2+by^2)$$

while the phase transfer function $\phi(x, y)$ of the off-axis type hologram has the following mathematical expression:

$$\phi(x, y)=(2\pi/\lambda)\cdot(ax^2+by^2+\sin(\alpha)y)$$

From the above expression, the spatial frequency of the in-line type hologram with respect to the y direction is written as follows:

$$(1/2\pi)\cdot(\delta/\delta y)\cdot\{(2\pi/\lambda)\cdot(ax^2+by^2)\}$$

Hence, the above expression is rewritten as follows:

$$(1/\lambda)\cdot 2by$$

The spatial frequency of the off-axis type hologram with respect to the y direction is written as follows:

$$(1/2\pi)\cdot(\delta/\delta y)\cdot\{(2\pi/\lambda)\cdot(ax^2+by^2+\sin(\alpha)y)\}$$

Hence, the above expression is rewritten as follows:

$$(1/\lambda)\cdot\{2by+\sin(\alpha)\}$$

Figure 14:
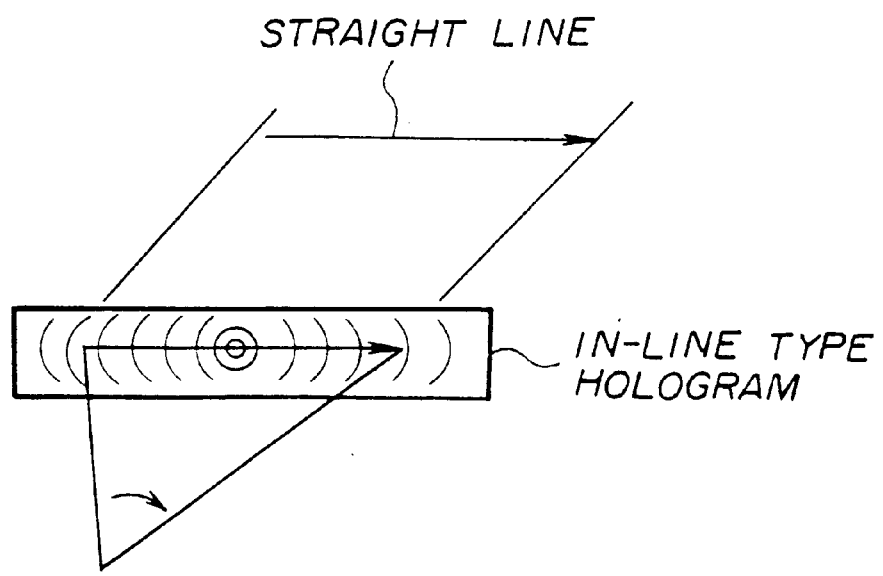
FIG. 14 is a diagram of a scanning process for the in-line type hologram.
Figure 15:
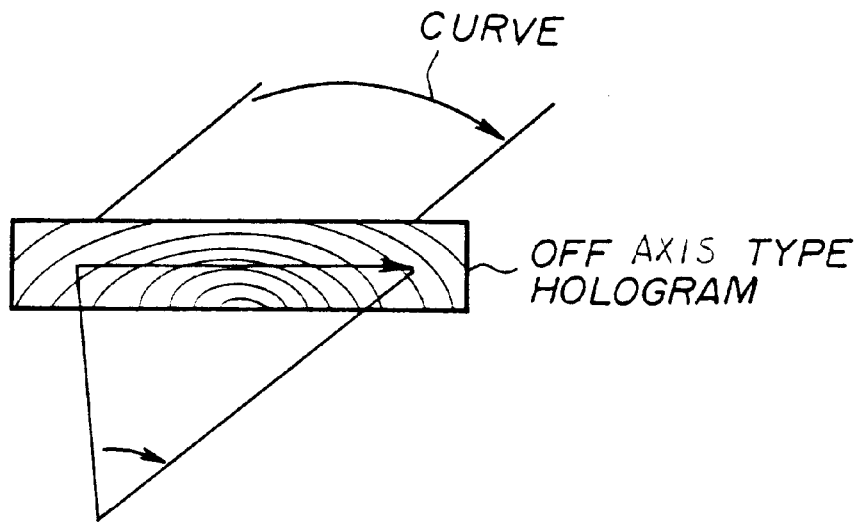
FIG. 15 is a diagram of a scanning process for the off-axis type hologram.

It can be seen from the above that the optical scanning system using the in-line type hologram can achieve linear scan as shown in FIG. 14, while the optical scanning system using the off-axis type hologram makes a curved scan as shown in FIG. 15.

Figure 16:
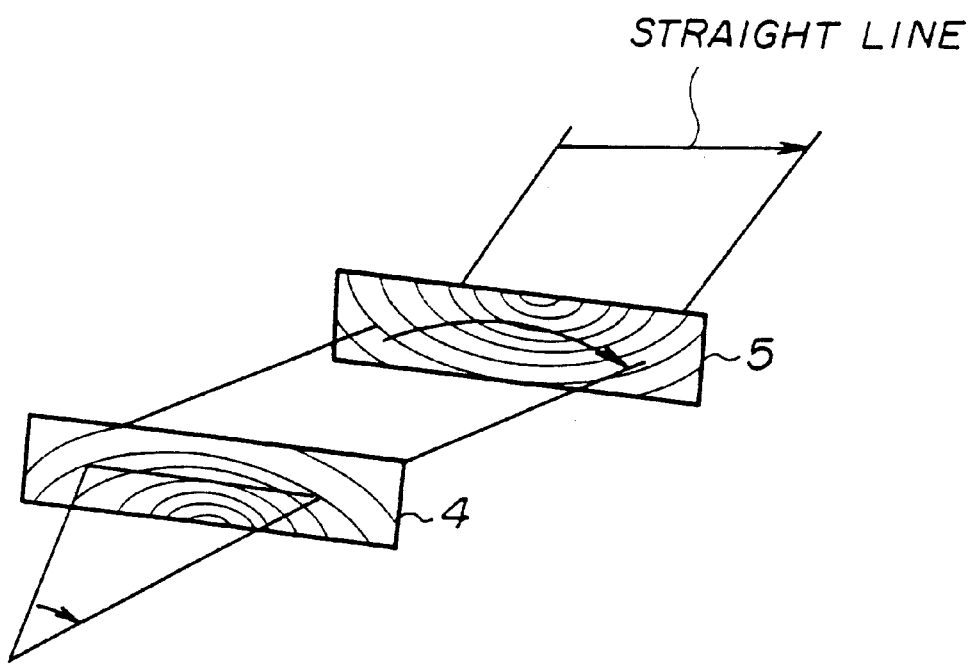
FIG. 16 is a perspective view of a scanning process according to the present invention.

In order to eliminate the curved-scan problem, when the first-stage hologram element 4 has an off-axis hologram, the second-stage hologram element 5 has an off-axis hologram, so that the terms $\sin(\alpha)$ of these two holograms have different signs and have adjusted values so that the curved scans generated in the two holograms are canceled, whereby linear scanning as shown in FIG. 16 can be achieved. When the above structure is employed, the optical-axis center of the first-stage hologram element 4 and the optical-axis center of the second-stage hologram element 5 are not located on the same plane.

Figure 17:
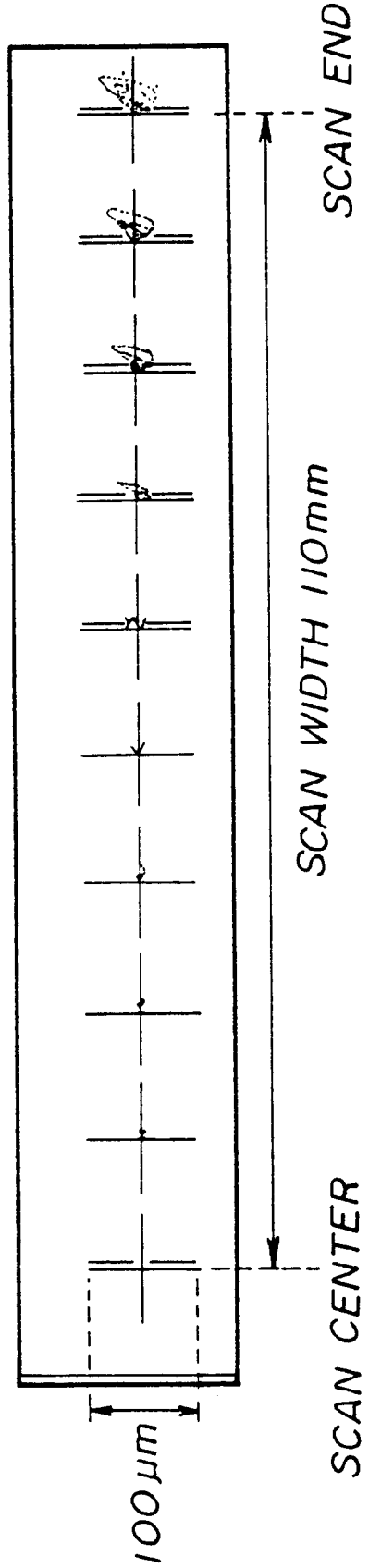
FIG. 17 is a diagram showing simulation data.

FIG. 17 shows an example of simulation data of the beam aberration of the present invention optical scanning system in which the first-stage hologram element 4 and the second-stage hologram element 5 have off-axis holograms. In the simulation performed in order to obtain the simulation data shown in FIG. 17, a plurality of terms of products of even powers of x and odd powers of y are added to the phase transfer function $\phi(x, y)$ in order to reduce the beam aberration. It can be seen from the simulation data shown in FIG. 17 that the sufficiently reduced beam aberration in terms of practical use can be obtained.

Holograms are categorized into a convergency type hologram in which the phase transfer function $\phi(x, y)$ have negative values in the peripheral portions of the holograms or a divergency type in which the phase transfer function $\phi(x, y)$ have positive values in the peripheral portions of the holograms. The convergency type holograms have the convex lens function, and the divergency type holograms have the concave lens function.

With the above in mind, according to the present invention, in order to further reduce the size of the beam spot, the coefficient values of the phase transfer functions $\phi(x, y)$ of the hologram elements 4 and 5 are determined so that when the phase characteristic of the phase transfer function $\phi(x, y)$ of the first-stage hologram element 4 indicates convergency, the phase characteristic of the phase transfer function $\phi(x, y)$ of the second-stage hologram element 5 indicates divergency. Alternatively, the coefficient values of the phase transfer functions $\phi(x, y)$ of the hologram elements 4 and 5 are determined so that when the phase characteristic of the phase transfer function $\phi(x, y)$ of the first-stage hologram element 4 indicates divergency, the phase characteristic of the phase transfer function $\phi(x, y)$ of the second-stage hologram element 5 indicates convergency.

It has been confirmed from simulation data that less beam aberration can be obtained when the phase characteristic of the phase transfer function $\phi(x, y)$ of the first-stage hologram element 4 indicates convergency, and the phase characteristic of the phase transfer function $\phi(x, y)$ of the second-stage hologram element 5 indicates divergency.

As described above, when the distance from the center of the hologram is expressed with r, namely $(x^2+y^2)^{0.5}$, the present invention has the basic structure in which the phase transfer functions $\phi(x, y)$ of the first-stage hologram element 4 and the second-stage hologram element 5 are expanded with even powers of r. Then, the coefficient values of the above phase transfer functions of the phase transfer functions $\phi(x, y)$ are determined so that the constant-velocity linear scan, cancellation of waveform jitters and reduced beam aberration can be achieved.

Figure 18:
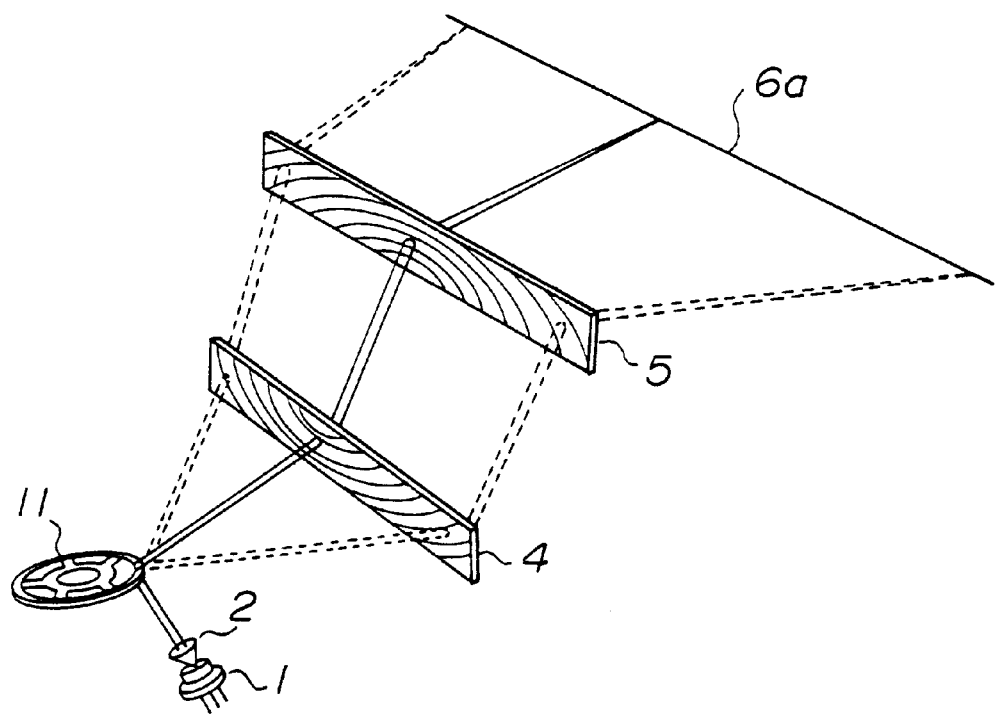
FIG. 18 is a perspective view of an optical scanning system according to a fifth embodiment of the present invention.

As a result, it becomes possible to use the high-revolution polygon mirror located in front of the first-stage hologram element 4 and to achieve high-speed laser scanning. However, the present invention is not limited to use of the polygon mirror but can use a hologram disk 11, as shown in FIG. 18. When the hologram disk 11 is used, the coefficient values of the phase transfer functions $\phi(x, y)$ of the hologram disk 11, the first-stage hologram element 4, and the second-stage hologram element 5 are optimized in order to achieve the constant-velocity linear scan, cancellation of waveform jitters, and reduced beam aberration.

The present invention is not limited to the specifically disclosed embodiment. For example, the present invention is not limited to the optical scanning system having the coefficient values shown in FIGS. 4A and 4B.

According to the present invention, it becomes possible to provide an optical scanning system capable of performing highly-precise, high-speed laser scanning. The present invention does not need any f-θ lens system, and a compact and less-expensive optical scanning system can be provided and practically used.

What is claimed is:

1. An optical scanning system comprising:
   a laser source;
   a deflector deflecting a laser beam emitted from the laser source, said deflector comprising a mirror which reflects the laser beam; and
   two hologram elements located between the deflector and an image forming member;
   wherein each of said two hologram elements has the following phase transfer function $\phi(x,y)$:

$$\phi(x, y)=(2\pi/\lambda)\cdot\{\Sigma c_i r^{2i}\}$$

wherein x denotes a position in the scanning direction of said two hologram elements, y denotes a position in a direction perpendicular to the scanning direction, r denotes a distance from a center of the hologram, namely $(x^2+y^2)^{0.5}$, $\lambda$ is a wavelength of the laser beam, $c_i$ denotes coefficients, and i is a variable of summation of form i equals 1 to n, where n has an integer value of 1 or greater, and
   wherein the phase transfer functions of the two hologram elements have respective phase characteristics opposite one another so that variations in the wavelength of the light source can be corrected.

2. An optical scanning system comprising:
   a laser source;
   a deflector deflecting a laser beam emitted from the laser source, said deflector comprising a mirror which reflects the laser beam; and
   two hologram elements located between the deflector and an image forming member;
   wherein:
   each of said two hologram elements has the following phase transfer function $\phi(x, y)$:

$$\phi(x,y)=(2\pi/\lambda)\cdot\{\Sigma c_i r^{2i}+\sin(\alpha)y\}$$

wherein x denotes a position in the scanning direction of said two hologram elements, y denotes a position in a direction perpendicular to the scanning direction, r denotes a distance from a center of the hologram, namely $(x^2+y^2)^{0.5}$, $\lambda$ is a wavelength of the laser beam, $c_i$ denotes coefficients, i is a variable of summation of form i equals 1 to n, where n has an integer value of 1 or greater, and $\alpha$ denotes an arbitrary angle;
   wherein signs of the terms $\sin(\alpha)$ in the phase transfer functions of said two hologram elements are different from each other, and
   wherein the phase transfer functions of the two hologram elements have respective phase characteristics opposite one another so that variations in the wavelength of the light source can be corrected.

3. An optical scanning system comprising:
   a laser source;
   a deflector deflecting a laser beam emitted from the laser source, said deflector comprising a mirror which reflects the laser beam; and
   two hologram elements located between the deflector and an image forming member,
   wherein each of said two hologram elements has the following phase transfer function $\phi(x, y)$:

$$\phi(x, y)=(2\pi/\lambda)\cdot Z,$$

where x denotes a position in the scanning direction of of said two hologram elements, y denotes a position in a direction perpendicular to the scanning direction, $\lambda$ is a wavelength of the laser beam, and Z denotes one or a plurality of terms of products of even powers of x and odd powers of y.

4. An optical scannig system comprising:
   a laser source;
   a deflector deflecting a laser beam emitted from the laser source, said deflector comprising a mirror which reflects the laser beam; and
   two hologram elements located between the deflector and an image forming member;
   wherein each of said two hologram elements has the following phase transfer function $\phi(x, y)$:

$$\phi(x, y)=(2\pi/\lambda)\cdot\{Z+\sin(\alpha)y\}$$

where x denotes a position in the scanning direction of said two hologram elements, Y denotes a position in a direction perpendicular to the scanning direction, $\lambda$ is a wavelength of the laser beam, $\alpha$ denotes an arbitrary angle, and Z denotes one or a plurality of terms of products of even powers of x and odd powers of y.

5. The optical scanning system as claimed in claim 1, wherein the phase transfer function $\phi(x, y)$ of each of said two hologram elements contains, in the term $\Sigma$, one or a plurality of terms of products of even powers of x and even powers of y.

6. The optical scanning system as claimed in claim 2, wherein the phase transfer function $\phi(x, y)$ of each of said two hologram elements contains, in the term $\Sigma$, one or a plurality of terms of products of even powers of x and even powers of y.

7. The optical scanning system as claimed in claim 1, wherein:
   the optical scanning system comprises only two hologram elements;
   a phase characteristic of the phase transfer function $\phi(x, y)$ of one of said only two hologram elements is convergent, wherein said convergency corresponds to a hologram element functioning as a convex lens; and
   a phase characteristic of the phase transfer function $\phi(x, y)$ of the other one of said only two hologram elements is divergent, wherein said divergency corresponds to a hologram element functioning as a concave lens.

8. The optical scanning system as claimed in claim 2, wherein:
   the optical scanning system comprises only two hologram elements;
   a phase characteristic of the phase transfer function $\phi(x, y)$ of one of said only two hologram elements is convergent, wherein said convergency corresponds to a hologram element functioning as a convex lens; and
   a phase characteristic of the phase transfer finction $\phi(x, y)$ of the other one of said only two hologram elements is divergent, wherein said divergency corresponds to a hologram element functioning as a concave lens.

9. The optical scanning system as claimed in claim 1, wherein:
   the optical scanning system comprises only two hologram elements;
   a phase characteristic of the phase transfer function $\phi(x, y)$ of one of said only two hologram elements close to the deflector is convergent, wherein said convergency corresponds to a hologram element functioning as a convex lens; and a phase characteristic of the phase transfer function φ(x, y) of the other one of said only two hologram elements close to the image forming member is divergent, wherein said divergency corresponds to a hologram element funtioning as a concave lens.

10. The optical scanning system as claimed in claim 2, wherein:

the optical scanning system comprises only two hologram elements;

a phase characteristic of the phase transfer function φ(x, y) of one of said only two hologram elements close to the deflector is convergent, wherein said convergency corresponds to a hologram element functioning as a convex lens; and a phase characteristic of the phase transfer function φ(x, y) of the other one of said only two hologram elements close to the image forming member is divergent, wherein said divergency corresponds to a hologram element functioning as a concave lens.

11. The optical scanning system as claimed in claim 1, wherein:

the optical scanning system comprises only two hologram elements, and a glass plate having a first surface and a second surface opposite to the first surface;

one of the two hologram elements is attached to the first surface; and the other one of the two hologram elements is attached to the second surface.

12. The optical scanning system as claimed in claim 2, wherein:

the optical scanning system comprises only two hologram elements, and a glass plate having a first surface and a second surface opposite to the first surface;

one of the two hologram elements is attached to the first surface; and the other one of the two hologram elements is attached to the second surface.

13. An optical scanning system, comprising:

a laser source;

a deflector deflecting a laser beam emitted from the laser source, said deflector comprising a mirror which reflects the laser beam;

two hologram elements located between the deflector and an image forming member; and a lens located between the deflector and one of said two hologram elements facing the deflector, said lens having a flat surface facing the deflector, and a convex spherical surface facing said one of the two hologram elements, wherein each of said two hologram elements has the following phase transfer function φ(x,y):

$$\text{function } \phi(x,y) = (2\pi/\lambda) \cdot \{\Sigma c_i r^{2i}\}$$

wherein x denotes a position in the scanning direction of said two hologram elements, y denotes a position in a direction perpendicular to the scanning direction, r denotes a distance from a center of the hologram, namely $(x^2+x^2)^{0.5}$, λ is a wavelength of the laser beam, $c_i$ denotes coefficients, and i is a variable of summation of form i equals 1 to n, where n has an integer value of 1 or greater.

14. An optical scanning system comprising:

a laser source;

a deflector deflecting a laser beam emitted from the laser source; said deflector comprising a mirror which reflects the laser beam;

two hologram elements located between the deflector and an image forming member;

a lens located between the deflector and one of said two hologram elements facing the deflector, said lens having a flat surface facing the deflector, and a convex spherical surface facing said one of the two hologram elements, wherein;

each of said two hologram elements has the following phase transfer function φ(x, y):

$$\phi(x, y) = (2\pi/\lambda) \cdot \{\Sigma c_i r^{2i} + \sin(\alpha)y\}$$

wherein x denotes a position in the scanning direction of said two hologram elements, y denotes a position in a direction perpendicular to the scanning direction, r denotes a distance from a center of the hologram namely $(^2+y^2)^{0.5}$, λ is a wavelength of the laser beam, $C_i$ denotes coefficients, i is a variable of summation of form i equals 1 to n, where n has an integer value of 1 or greater, and α denotes an arbitrary angle, and wherein signs of the terms sin(α) in the phase transfer functions of said two hologram elements are different from each other.

* * * * *